United States Patent [19]
Boaz et al.

[11] 3,903,396
[45] Sept. 2, 1975

[54] HEATABLE WINDSHIELD ASSEMBLY

[75] Inventors: Premakaran T. Boaz, Southgate; James S. Maluchnik, St. Clair Shores, both of Mich.

[73] Assignee: Ford Motor Company, Dearborn, Mich.

[22] Filed: Apr. 23, 1974

[21] Appl. No.: 463,344

[52] U.S. Cl. ............... 219/547; 219/522; 296/84 R; 428/433; 428/437
[51] Int. Cl.² .......................................... H05B 3/10
[58] Field of Search .............. 161/192, 203, 196, 2; 296/84 R; 52/171; 156/99; 219/203, 279, 522, 542, 547

[56] References Cited
UNITED STATES PATENTS

| | | | |
|---|---|---|---|
| 2,184,876 | 12/1939 | Sherts | 161/252 |
| 3,178,334 | 4/1965 | Bragaw | 161/252 |
| 3,317,906 | 5/1967 | Baldridge | 296/84 R |
| 3,409,759 | 11/1968 | Bokey et al. | 219/203 |
| 3,484,583 | 12/1969 | Shaw | 219/203 |
| 3,789,192 | 1/1974 | Spindler | 219/203 |

*Primary Examiner*—George F. Lesmes
*Assistant Examiner*—Paul J. Thibodeau
*Attorney, Agent, or Firm*—William E. Johnson; Keith L. Zerschling

[57] ABSTRACT

A heatable windshield assembly is disclosed. The assembly has a first sheet of glass with resistance wires and electrical structure overlying its inner surface. A first sheet of vinyl overlies the resistance wires and the electrical structure and bondably contacts the inner surface of the first glass sheet. The first sheet of vinyl has a reduced level of plasticizer therein. A second sheet of vinyl overlies and bondably contacts the first sheet of vinyl. The second sheet of vinyl has a normal level of plasticizer therein. A second sheet of glass bondably contacts the second sheet of vinyl. The bonding of the glass and vinyl sheets is accomplished in a glass laminating operation.

3 Claims, 2 Drawing Figures

HEATABLE WINDSHIELD ASSEMBLY

BACKGROUND OF THE INVENTION

Heatable windshield structures have been proposed in which a plurality of fine wires are embedded between a pair of laminating interlayers. Electrical power is supplied to the plurality of fine wires in order to defrost or defog the windshield. The application of electrical power to the fine wires generates the heat which is necessary in the defogging on defrosting operation. It has been found, however, that when heat is generated in such structures, an optical distortion occurs around each of the wires which is proportional to the power dissipated in the wires and the amount of plasticizer in the vinyl of the laminating interlayers. If the power to the fine wires is reduced, the efficiency of the defogging and defrosting operations is reduced.

It is a principal object of this invention to provide a heatable windshield assembly employing fine resistance wires in which optical distortion associated with applying power to the wires is substantially reduced.

SUMMARY OF THE INVENTION

This invention relates to a windshield assembly, and, more particularly, to a heatable windshield assembly. The heatable windshield assembly of this invention includes the following structure. A first sheet of glass having an inner and an outer surface is provided. A plurality of fine resistance wires are positioned against the inner surface of the first sheet of glass. Electrical connecting structure is connected to the plurality of fine wires to form a circuit therethrough. A first of vinyl having first and second surfaces is positioned so that the first surface thereof overlies both the resistance wires and the electrical structure. Vinyl, as used throughout the specification, refers to polyvinyl butyral. The first surface of the first sheet of vinyl also bondably contacts the inner surface of the first sheet of glass. The first sheet of vinyl has a reduced level of plasticizer therein. A second sheet of vinyl has a first surface thereof overlying and bondably contacting the second surface of the first sheet of vinyl. The second sheet of vinyl has a normal level of plasticizer therein for windshield applications. An inner surface of a second sheet of glass overlies and is in bondable contact with the second surface of the second sheet of vinyl. The bonding of the first and the second sheets of glass and the first and the second sheets of vinyl is accomplished in a glass laminating operation.

DESCRIPTION OF THE PREFERRED EMBODIMENT

Figure 1:
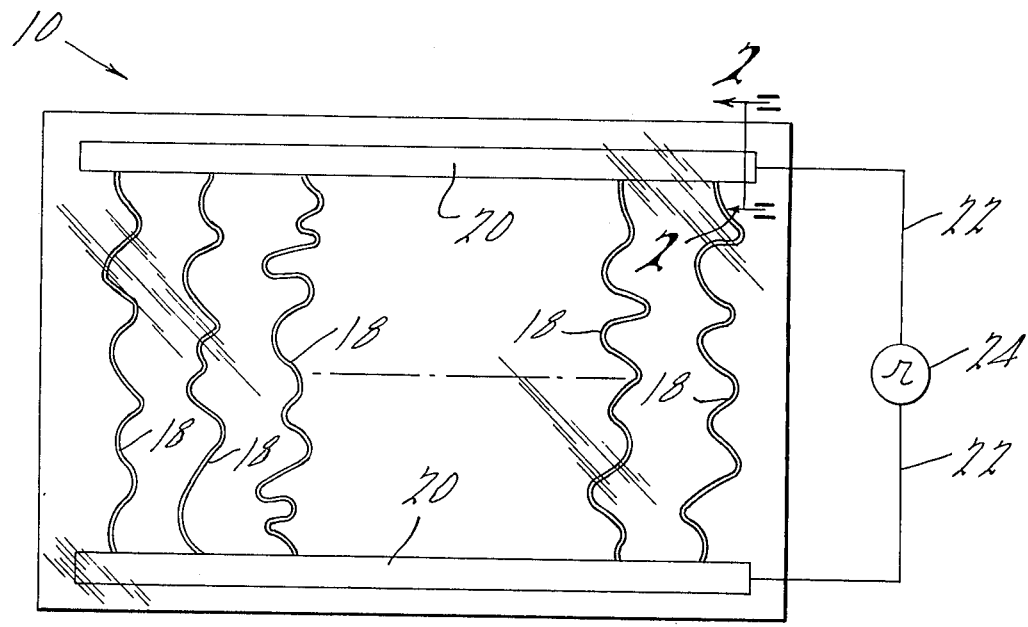
FIG. 1 is a diagrammatic; front elevation view of a heatable windshield structure formed in accordance with the teachings of this invention.
Figure 2:
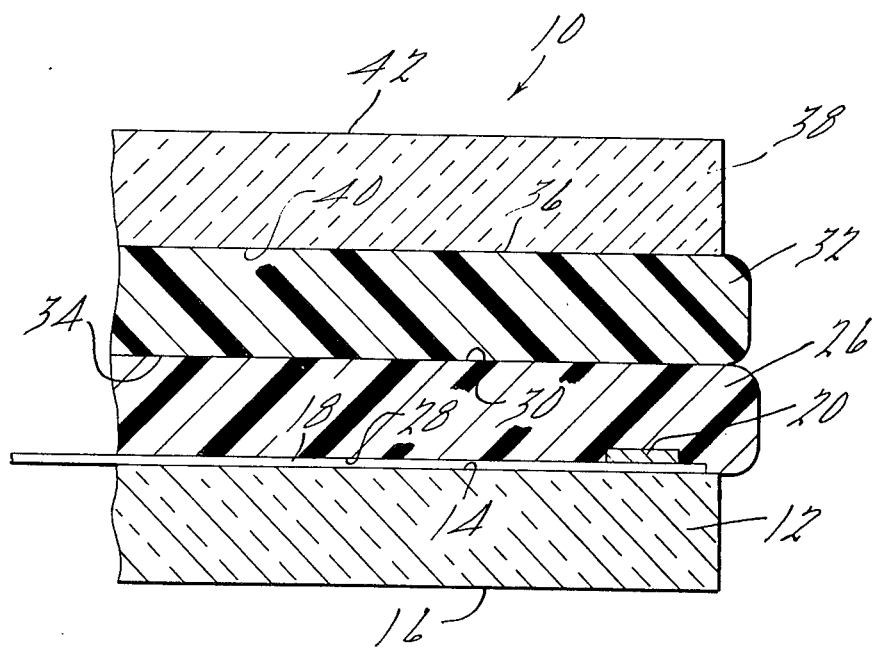
FIG. 2 is a cross sectional view taken along line 2—2 of FIG. 1.

In FIG. 1 there is shown a heatable windshield assembly generally identified by the numeral 10. As best seen in FIG. 2, the windshield assembly includes a first sheet of glass 12 having an inner surface 14 and an outer surface 16. This glass sheet is generally the long templet for an automotive glass windshield. The glass sheet may be the normal soda lime glass which is produced in float glass operations. The glass would have a thickness in the range of from 0.100 to 0.125 inches. The outer surface 16 would be the surface of the windshield facing out from the vehicle.

A plurality of fine resistance wires 18 are shown in contact with the inner surface 14 of the first glass sheet 12. These wires are generally formed from tungsten wire having a diameter of about 0.0004 inches. The wires are laid down with a density of about 12 to 14 wires per inch. Randam wiggles are placed in the wire so that the eye will not notice any symmetry thereof and to reduce any diffraction pattern. The plurality of resistance wires are connected by means of a thin copper bus bar 20, and electrical leads 22 to a power source 24. When the power source is functioning, electrical current provided to the resistance wires causes a heating of the windshield assembly 10 so that a defrosting or defogging operation takes place.

A first sheet of vinyl 26 has a first surface 28 and a second surface 30. This first sheet of vinyl has a plasticizer content reduced from that which is normally found in vinyl used for laminating automotive windshields. In particular, a normal laminating interlayer would have a plasticizer content of about 42%. The plasticizer content of the first vinyl sheet 26 is, however, only about 21%.

The first surface 28 of the first vinyl sheet 26 overlies and is in bonding contact with the inner surface 14 of the first glass sheet 12 as well as with the resistance wires 18 and the copper bus bar 20 which it overlies. The first sheet of vinyl 26 has a thickness of from about 0.015 to 0.020 inches.

A second vinyl sheet 32 has a first surface 34 and a second surface 36. The second vinyl sheet has a normal plasticizer content for automotive glass laminating operations. Generally a normal plasticizer level is considered to be about 42%. The first surface of the second vinyl sheet overlies and is in bondable contact with the second surface 30 of the first vinyl sheet 26.

A second sheet of soda lime glass 38 has an inner surface 40 and an outer surface 42. The inner surface 40 of the second glass sheet 38 overlies and is in bonding contact with the second surface 36 of the second vinyl sheet 32. The bonding of the first and second sheets of glass and the first and second sheets of vinyl to form the laminated windshield assembly 10 is accomplished in a normal glass laminating operation.

By utilizing the first vinyl sheet 26 with a reduced plasticizer amount contained therein, the distortion occasioned by applying power to the fine wires 18 is substantially reduced. Also the location of the wires next to the outer glass 12 reduces the optical distortion. For example, when the 0.0004 inch tungsten wire is utilized as described herein, distortion around the wires can be expected at 0.4 watts per square inch power application if normal vinyl material having the full amount of plasticizer therein is used. If the lower amount of plasticizer is used, up to 0.65 watts per square inch can be applied without distortion. By using the two different vinyls having different levels of plasticizer therein, greater laminated strength is achieved in the windshield of this invention.

Having described our invention what we claim is:
1. A heatable windshield assembly which comprises:
   a first sheet of glass having an inner surface and an outer surface;

a plurality of fine resistance wires having random wiggles therein positioned against the inner surface of the first sheet of glass;

electrical means for forming a circuit through the resistance wires;

a first sheet of glass laminating, polyvinyl butyral having first and second surfaces, the first surface overlying both the resistance wires and electrical means and bondably contacting the inner surface of the first glass sheet, the first sheet of glass laminating, polyvinyl butyral having a plasticizer content of about 21 percent therein;

a second sheet of glass laminating, polyvinyl butyral having first and second surfaces, the first surface overlying and bondably contacting the second surface of the first sheet of glass laminating, polyvinyl butyral, the second sheet of glass laminating, polyvinyl butyral having a level of about 42 percent plasticizer therein sufficient for windshield laminating applications;

a second sheet of glass having an inner surface and an outer surface, the second surface of the second sheet of glass laminating, polyvinyl butyral overlying and bondably contacting the inner surface of the second glass sheet;

the bonding of the first and second glass sheets and the first and second glass laminating, polyvinyl butyral sheets being accomplished in a glass laminating operation.

2. The assembly of claim 1 wherein:

the outer surface of the first sheet of glass is the outer surface of the heatable windshield.

3. The assembly of claim 2 wherein:

the plurality of fine wires are formed of tungsten having a diameter of about 0.0004 inches.

* * * * *